(12) United States Patent
Usui et al.

(10) Patent No.: US 6,814,206 B2
(45) Date of Patent: Nov. 9, 2004

(54) TEMPERATURE-CONTROLLED FLUID COUPLING

(75) Inventors: Masayoshi Usui, Numazu (JP); Hiroshi Inoue, Numazu (JP)

(73) Assignee: Usui Kokusai Sangyo Kaisha Ltd., Shizuoka (JP)

(*) Notice: Subject to any disclaimer, the term of this patent is extended or adjusted under 35 U.S.C. 154(b) by 0 days.

(21) Appl. No.: 10/391,552

(22) Filed: Mar. 20, 2003

(65) Prior Publication Data

US 2003/0230460 A1 Dec. 18, 2003

(30) Foreign Application Priority Data

Mar. 29, 2002 (JP) .......................................... 2002-095260

(51) Int. Cl.$^7$ .......................... F16D 35/02; F16D 43/25
(52) U.S. Cl. ........................... 192/58.684; 192/58.681; 192/58.8; 192/82 T
(58) Field of Search ...................... 192/58.681, 58.684, 192/58.8, 58.68, 82 T (56) References Cited

U.S. PATENT DOCUMENTS

| | | | | |
|---|---|---|---|---|
| 3,257,808 A | * | 6/1966 | Kuiper | ...................... 192/82 T |
| 3,968,866 A | * | 7/1976 | Leichliter et al. | ......... 192/58.68 |
| RE30,608 E | * | 5/1981 | Bopp | ...................... 192/58.68 |
| 4,282,961 A | * | 8/1981 | Roscoe | ................... 192/58.681 |
| 4,662,495 A | | 5/1987 | Brunken | |
| 4,846,331 A | * | 7/1989 | Ono | ....................... 192/58.681 |
| 4,909,367 A | * | 3/1990 | Elmer | ....................... 192/82 T |
| 4,913,273 A | * | 4/1990 | Mader | ....................... 192/82 T |
| 4,930,457 A | | 6/1990 | Tamai | |
| 5,125,491 A | * | 6/1992 | Takikawa et al. | ....... 192/58.681 |

FOREIGN PATENT DOCUMENTS

| | | |
|---|---|---|
| JP | 55-616 | 1/1980 |
| JP | 04-054317 | 2/1992 |

* cited by examiner

*Primary Examiner*—Rodney H. Bonck
(74) *Attorney, Agent, or Firm*—Wenderoth, Lind & Ponack, L.L.P.

(57) ABSTRACT

A temperature-controlled fluid friction coupling is actuated by a flow of viscous fluid flowing into or out of shearing surface gaps disposed therein. An, the actuating pin is movable in a direction parallel to a surface of a partition. A swing-type valve lever is in contact with the actuating pin near a root end of the valve lever, and a swing end of the valve lever is arranged slidably movable while in contact with a surface of the partition having a valve opening therein. In response to a deformation of the temperature sensitive element caused by a change of air temperature, the actuating pin moves in a direction parallel to the surface of the partition, and then the swing end of the valve lever moves so as to open and close the valve opening. Thus, the fluid flow from a reservoir chamber to a torque transmitting chamber is controlled.

3 Claims, 10 Drawing Sheets

TEMPERATURE-CONTROLLED FLUID COUPLING

FIELD OF THE INVENTION

This invention relates to a temperature-controlled fluid coupling for intermittently driving a cooling fan attached to an automotive engine or similar equipment.

BACKGROUND OF THE INVENTION

U.S. Pat. No. 4,662,495 (Brunken) discloses a typical design of a temperature-controlled fluid friction coupling. According to this design, a housing is rotatably supported on a drive input shaft adapted to connect with an internal combustion engine. The interior space of the housing is separated by a partition into a reservoir chamber and a fluid working chamber. On the drive input shaft, a rotor is fixed so as to form mutually opposite shearing gaps between the housing and the rotor. A radiator cooling fan is mounted on the housing. To the outer surface of the housing, is mounted a temperature sensitive element made of a bimetallic plate which curves in response a change of ambient temperature. In the partition, is provided a valve opening which is opened, narrowed and closed by an actuating pin contacting with the bimetallic plate. As the bimetallic plate is deformed by a change of the ambient temperature, the actuating pin is operated to open, narrow or close the valve opening. Then, viscous fluid flows into or out of the shearing gaps to effect or break a torque transmitting function.

The temperature sensed by the temperature sensitive element is generally the temperature of air coming from an internal combustion engine radiator. For example, at a temperature below a predetermined value, such as 60 degrees centigrade, the bimetal plate is kept on a flat configuration, so that the valve lever closes the valve opening permitting the coupling to be in a disengaged condition (OFF). On the other hand, if the temperature rises beyond 60 degrees centigrade, the bimetal plate is bent into a curved configuration, so that the valve lever leaves the valve opening permitting the coupling to be in an engaged condition (ON).

In the prior art, the valve lever is generally made by an elongated flat plate and the free end thereof moves along the axial direction of the coupling thereby opening and closing the valve opening arranged in the partition.

However, this type of axially contacting and separating movement cannot provide a stable performance. For example, at the moment when the open area of the valve opening approaches a small limit, the valve lever tends to be attracted or stuck to the partition. On the other hand, at the moment when the open area of the valve opening approaches a large limit, the valve lever tends to be over-deflected leaving far from the partition. These undesirable phenomena are well known as "hunting" which means an irregular rotation or fluctuation of a fan rotation speed.

SUMMARY OF THE INVENTION

It is an object of the present invention to provide a fluid coupling for eliminating the irregular rotation due to hunting.

Another object of the present invention is to provide a precise operation of the valve opening, narrowing and closing functions.

Still another object of the present invention is to provide a high performance more sensitive to the temperature and more controllable in a wide range.

According to the present invention, there is provided a temperature-controlled fluid friction coupling for intermittently driving a cooling fan of an internal combustion engine. This coupling comprises a drive input shaft having a disk rotor thereon, a housing rotatably supported on the drive input shaft for supporting a cooling fan, a partition for dividing an interior space of the housing into a torque transmitting chamber and a reservoir chamber, a valve lever for opening and closing a valve opening arranged in the partition, a temperature sensitive element disposed outside of the cover, and an actuating pin extending through a guide hole arranged in the cover.

The housing includes a body and a cover. One end of the actuating pin contacts with the temperature sensitive element, and the other end of the actuating pin contacts with the valve lever.

The actuating pin is arranged movable in a direction parallel to the surface of the partition. The valve lever contacts with the actuating pin near the root end thereof, and the swing end of the valve lever is arranged slidably movable keeping in touch with the surface of the partition having the valve opening therein by reason of its inherent tension.

Thus, in response to a deformation of the temperature sensitive member caused by a change of ambient temperature, the actuating pin moves in a direction parallel to the surface of the partition, so that the swing end of the valve lever moves parallel to the surface of the partition keeping in touch with the surface for changing the open area of the valve opening, thereby controlling the fluid flow from the reservoir chamber to the torque transmitting chamber.

Based upon the above construction, the swing type valve lever of the present invention is not moved along the axial direction of the coupling, but is slidably moved along the circumferential direction of the coupling keeping in touch with the surface of the partition for opening and closing the valve opening. Thus, the valve performance is kept in a stable condition without an irregular rotation due to hunting.

Since the valve lever swings about a pivot near the root end thereof, it becomes possible to enlarge a leverage (power of a lever) of a linkage mechanism between the temperature sensitive element and the valve lever, so that a more temperature sensitive control becomes available.

As a still further advantage, in case that the temperature sensitive element is made by a rectangular bimetallic plate, prior bimetallic plates tend to be heated by radiation from the cover because they are arranged parallel to the surface of the cover. On the other hand, the bimetallic plate of the present invention is arranged perpendicularly to the cover, so that it can clear the radiation, thereby upgrading its sensitivity.

The temperature sensitive control mechanism in the present invention can be modified in miscellaneous arrangements.

BRIEF DESCRIPTION OF THE DRAWINGS

Embodiments of the invention will now be described by way of example with reference to the drawings, in which like reference numerals refer to like elements in the several views.

DESCRIPTION OF THE PREFERRED EMBODIMENT

Figure 1:
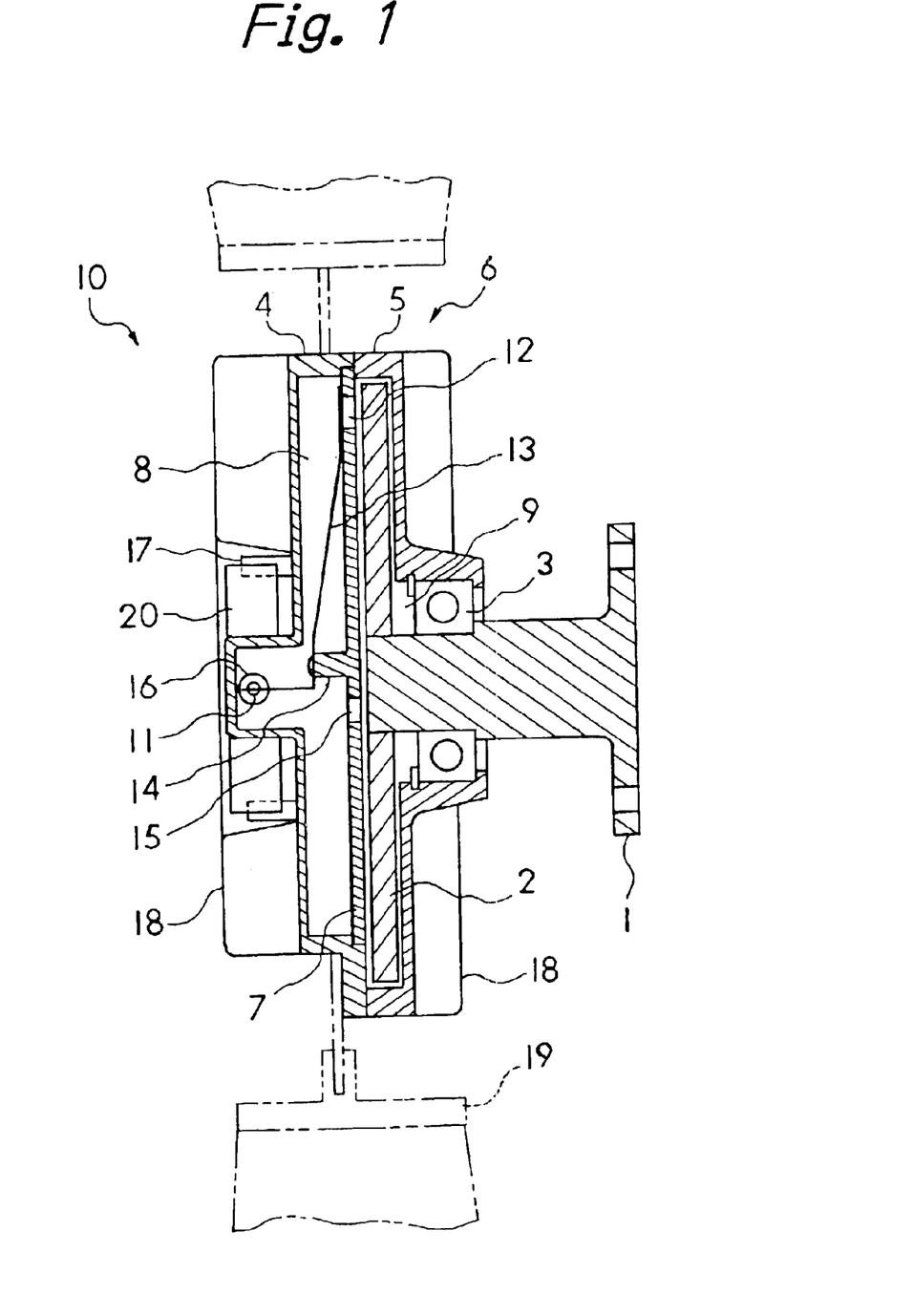
FIG. 1 is a vertical sectional view of a fluid coupling of the present invention.
Figure 2A:
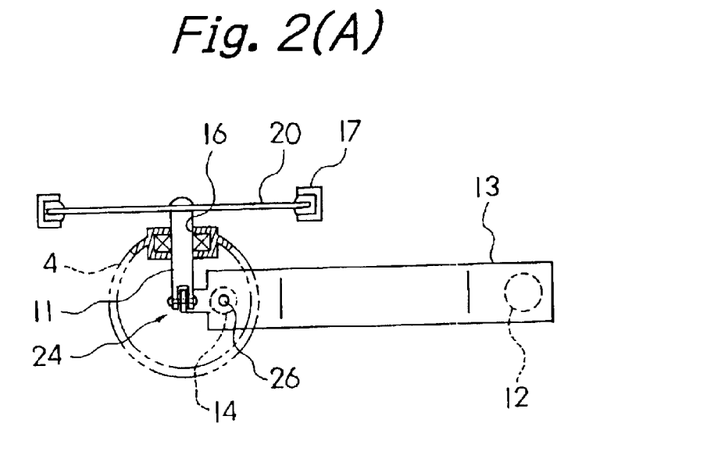
FIGS. 2a, 2b, 2c are sectional views of a control linkage mechanism between a temperature sensitive member and a valve lever.
Figure 2B:
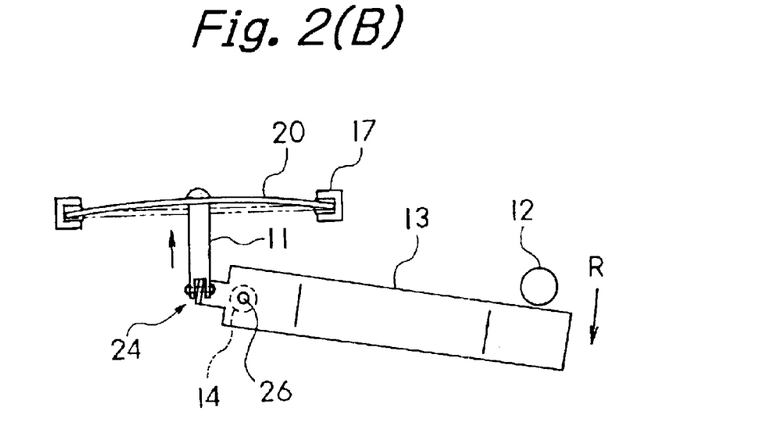
Figure 2C:
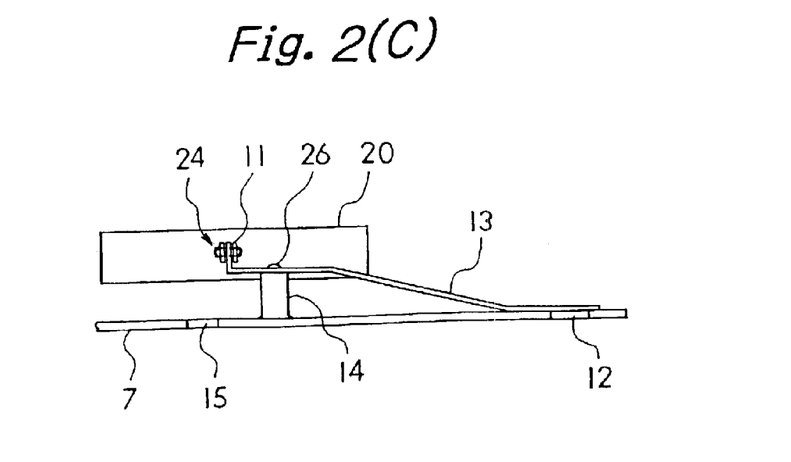
Figure 3:
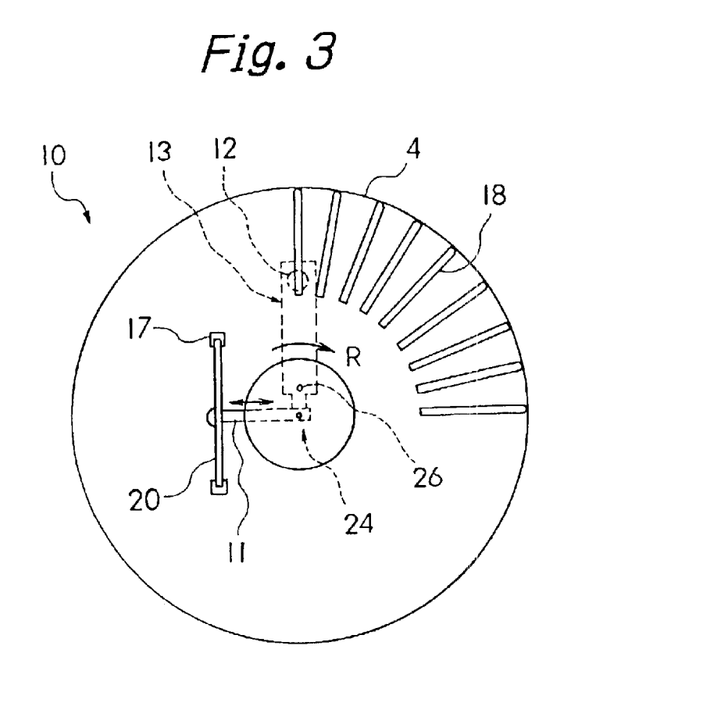
FIG. 3 is a frontal view of the fluid coupling.

Referring to FIGS. 1 to 3, there is shown a temperature-controlled fluid coupling 10 according to a preferred embodiment of the present invention. FIG. 1 shows a disengaged position (OFF), FIG. 2 shows an action of the temperature control mechanism and FIG. 3 shows a frontal configuration of the fluid coupling.

The coupling 10 includes a drive input shaft 1 having a disk rotor 2 thereon, and a sealed housing 6 rotatably supported on the drive input shaft 1 by means of a bearing 3. The housing 6 comprises a body 5 and a cover 4 sealed together.

The coupling 10 also includes a partition 7 for dividing an interior space of the housing 6 into a torque transmitting chamber 9 and a reservoir chamber 8, a swing-type valve lever 13 for opening and closing a valve opening 12 arranged in the partition 7, a plate-type temperature sensitive element (bimetal) 20 disposed outside of the cover 4, and an actuating pin 11 extending through a guide hole 16 arranged in the cover 4.

One end of the actuating pin 11 contacts with the temperature sensitive element 20, and the other end of the actuating pin 11 contacts with the valve lever 13.

Near the central portion of the partition 7, is arranged a fluid passage 15 for providing fluid communication between the torque transmitting chamber 9 and the reservoir chamber 8. As shown in FIG. 3, a plurality of cooling fins 18 are arranged on both sides of the housing 6. Outside of the housing 6, a radiator cooling fan 19 is attached thereto.

As shown in FIGS. 2a, 2b, the actuating pin 11 extends through the guide hole 16 located in the cover 4, and is arranged movable in a direction parallel to the surface of the partition 7.

At a connecting portion 24, the root end of the valve lever 13 is movably connected to the actuating pin 11 by means of a connecting pin insertion, and the swing end of the valve lever 13 is arranged slidably movable keeping in touch with the surface of the valve opening 12 by reason of its inherent tension. Further, an intermediate portion of the valve lever 13 is supported on a protrusion 14 arranged on the partition 7. The protrusion 14 provides a pivot (rivet head) 26, and by way of the pivot 26 the swing end of the valve lever 13 can move parallel to the surface of the partition 7 keeping in touch with the surface.

Thus, in response to a deformation of the temperature sensitive element 20 caused by a change of air temperature, the actuating pin 11 moves in a direction parallel to the surface of the partition 7, so that the swing end of the valve lever 13 moves parallel to the surface of the partition 7 keeping in touch with the surface 7 for changing the open area of the valve opening 12. Then, a stable and precise control of the fluid flow from the reservoir chamber 8 to the torque transmitting chamber 9 is established, which flow is urged by a centrifugal force of the fluid.

Finally, viscous fluid flows into the shearing gaps, and transmits torque from the disk rotor 2 to the housing 6, thereby causes a rotation of the fan 19 attached to the outside of the coupling 10.

FIGS. 2a–2c illustrate a valve action based upon a linkage mechanism between the bimetallic element 20 and the valve lever 13. FIG. 2a shows OFF condition in which the valve lever 13 closes the valve opening 12, FIG. 2b shows ON condition in which the valve lever 13 opens the valve opening 12, and FIG. 2c shows a side view of FIG. 2a. In these figures, each end of the bimetal 20 are movably supported within a bracket 17 fixed to the cover 4. To the central portion of the bimetal 20, the actuating pin 11 is fixed by a rivet, and the pin 11 extends through the guide hole 16 of the cover 4 into the inside of the coupling 10. The inner end of the pin 11 is positioned within the connecting portion 24.

In FIG. 2a, the temperature sensed by the bimetal 20, which temperature is air temperature coming from a radiator, is for example, below 60 degree centigrade, and the bimetal 20 keeps a flat configuration, so that the valve lever 13 closes the valve opening 12 permitting the coupling to be in the OFF condition.

In FIG. 2b, the temperature rises over 60 degrees centigrade, the bimetal 20 bends into a curved configuration, so that the valve lever 13 moves in the circumferential clockwise direction R about the pivot 26, thereby leaving the valve opening 12 permitting the coupling to be in the ON condition.

FIG. 3 is a left side frontal view of the fluid coupling 10 of FIG. 1. Some portions are cut off for easy illustration. As shown in FIG. 3, the plurality of cooling fins 18 are radially arranged outside of the cover 4. The pin 11 is shown movable right and left along the central portion of the cover 4.

Figure 4:
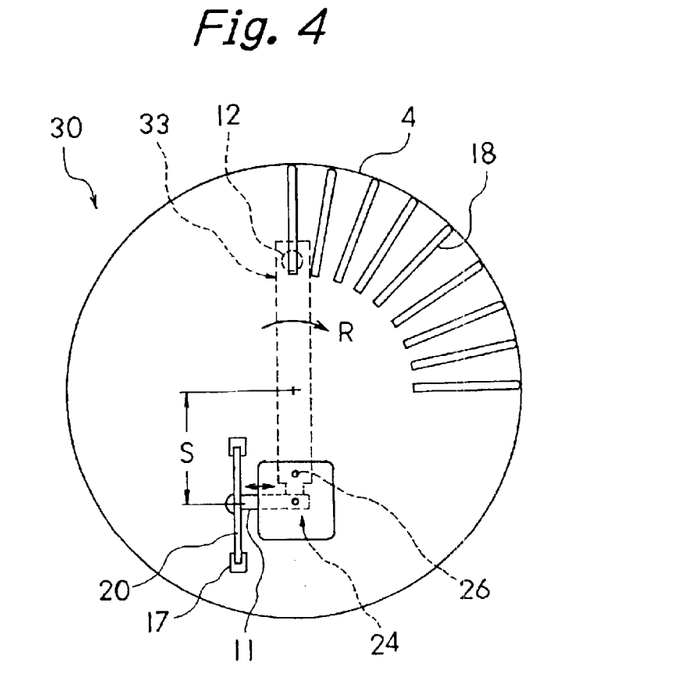
FIG. 4 is a frontal view of a modified coupling.

FIG. 4 is a frontal view of a fluid coupling 30 according to a modified embodiment. Some portions are cut off. In this embodiment, the intermediate portion of the valve lever 33 is prolongated, so that the location of the connecting portion 24 between the pin 11 and the valve lever 33 is translated to a new location having an offset S from the center of the cover 4. Further, a leverage for rotating the valve lever 33 towards the circumferential direction R so as to open and close the valve opening 12 is increased because the distance from the swing end of the valve lever 33 to the pivot 26 is larger than the distance in FIG. 3.

Thus, the sensitivity of the fluid coupling is considerably enhanced. Since the lever length of the valve lever 33 is enlarged, a relative speed of response between the bimetal 20 and air is also enlarged, so that a speedy response performance is obtained.

Figure 5A:
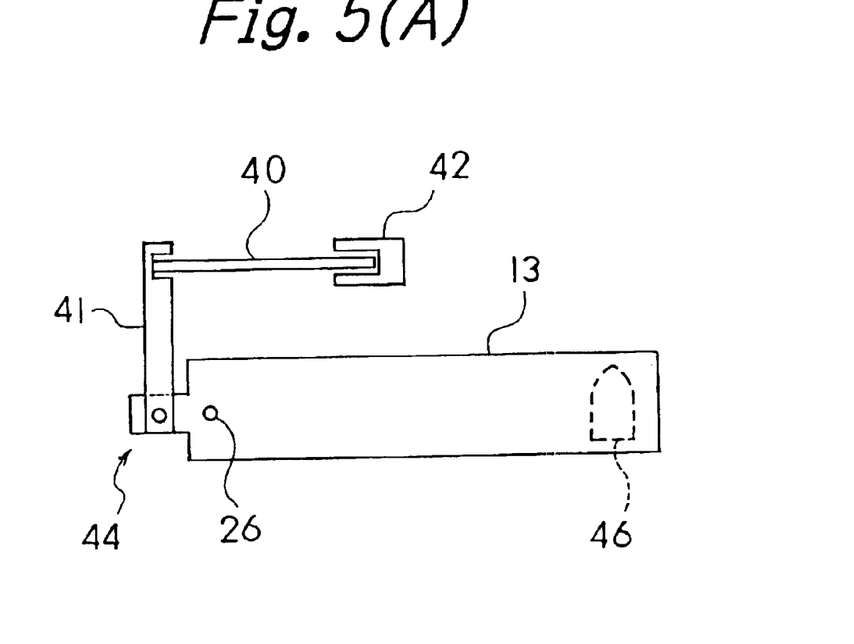
FIGS. 5a, 5b are frontal views of a modified linkage mechanism.
Figure 5B:
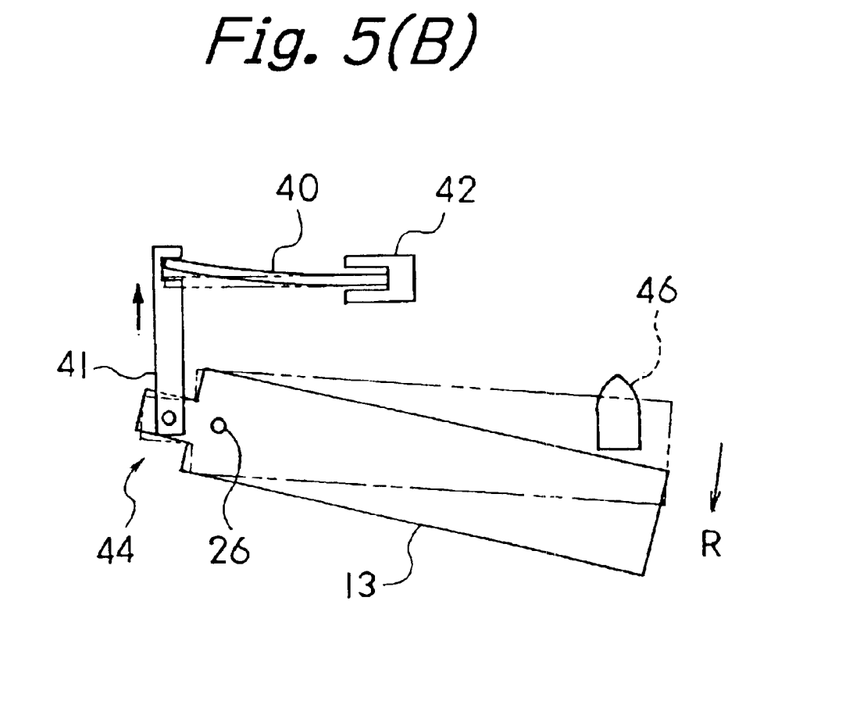

FIGS. 5a, 5b illustrate a cantilever-type bimetal 40 according to a further modified embodiment. In this embodiment, the bimetal 40 is supported within a single bracket 42 fixed to the cover 4 in a cantilever fashion.

In FIG. 5a, the bimetal 40 keeps a flat configuration and the valve lever 13 closes a rocket-form valve opening 46 permitting the coupling to be in the OFF condition.

In FIG. 5b, the temperature rises and the bimetal 40 bends into a curved configuration, so that the bimetal 40 forces the actuating pin 41 to move in its axial direction. Then, the swing end of the valve lever 13 moves in the circumferential clockwise direction R about the pivot 26, thereby leaving the valve opening 46 and permitting the coupling to be in the ON condition.

Figure 6A:
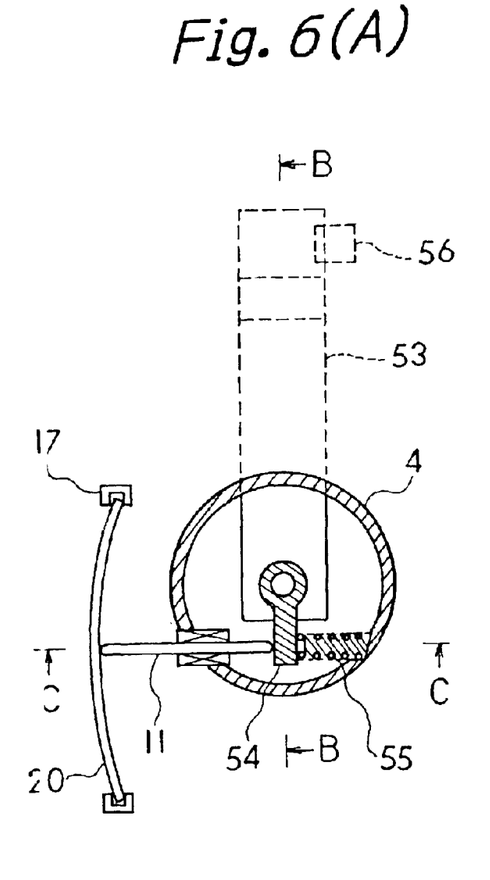
FIGS. 6a, 6b, 6c, 6d are sectional views of a further modified linkage mechanism.
Figure 6B:
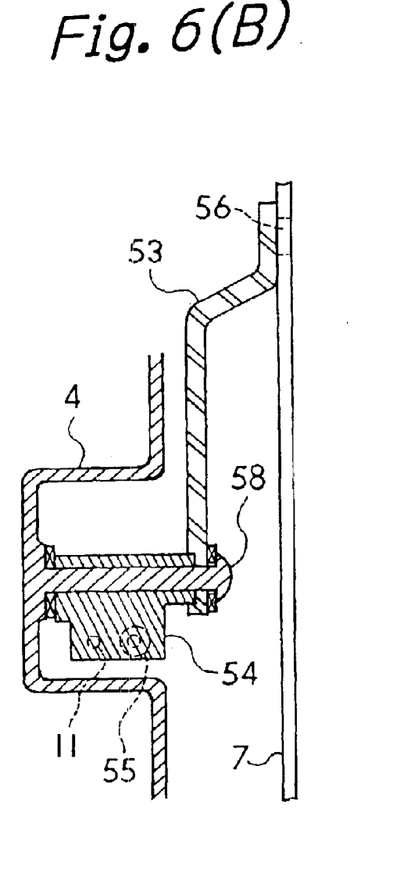
Figure 6C:
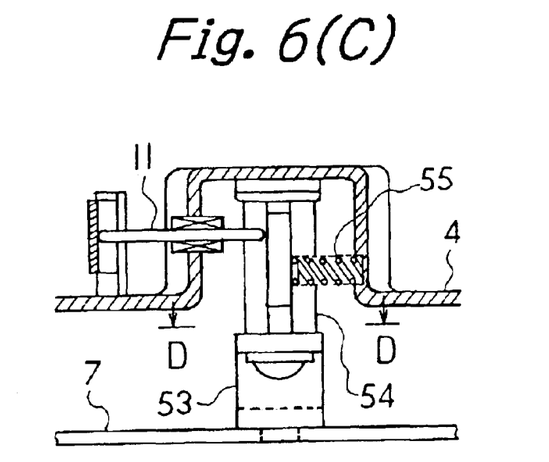
Figure 6D:
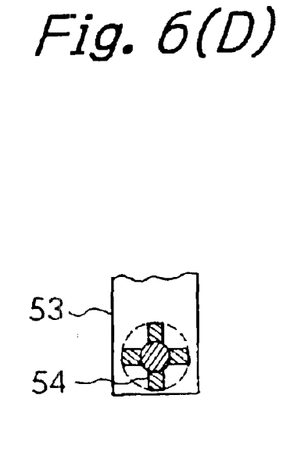

FIGS. 6a–6d illustrate a backup-spring type linkage mechanism according to a further modified embodiment. FIG. 6a is a frontal sectional view, FIG. 6b is a vertical sectional view along the line B—B in FIG. 6a, FIG. 6c is a vertical sectional view along the line C—C in FIG. 6a, and FIG. 6d is a partial sectional view along the line D—D in FIG. 6c.

In this embodiment, a swing arm 54 is attached to the root end of the leaf-spring type valve lever 53, and a backup spring 55 is inserted between the swing arm 54 and the cover 4 for backup supporting the swing arm 54 which is moved by the actuating pin 11. The valve lever 53 is supported on a protrusion 58 fixed to the cover 4 such that the swing end of the valve lever 53 can move parallel to the surface of the partition 7 keeping in touch with the surface.

In prior arts, this type of backup spring is not provided, resulting in a jumping movement or vibration of the valve lever 53. This vibration causes undesirable hunting during opening and closing actions of the valve opening 56. In this embodiment, the backup spring 55 can hold the valve lever 53 in its correct position, so that such hunting can be eliminated.

Figure 7:
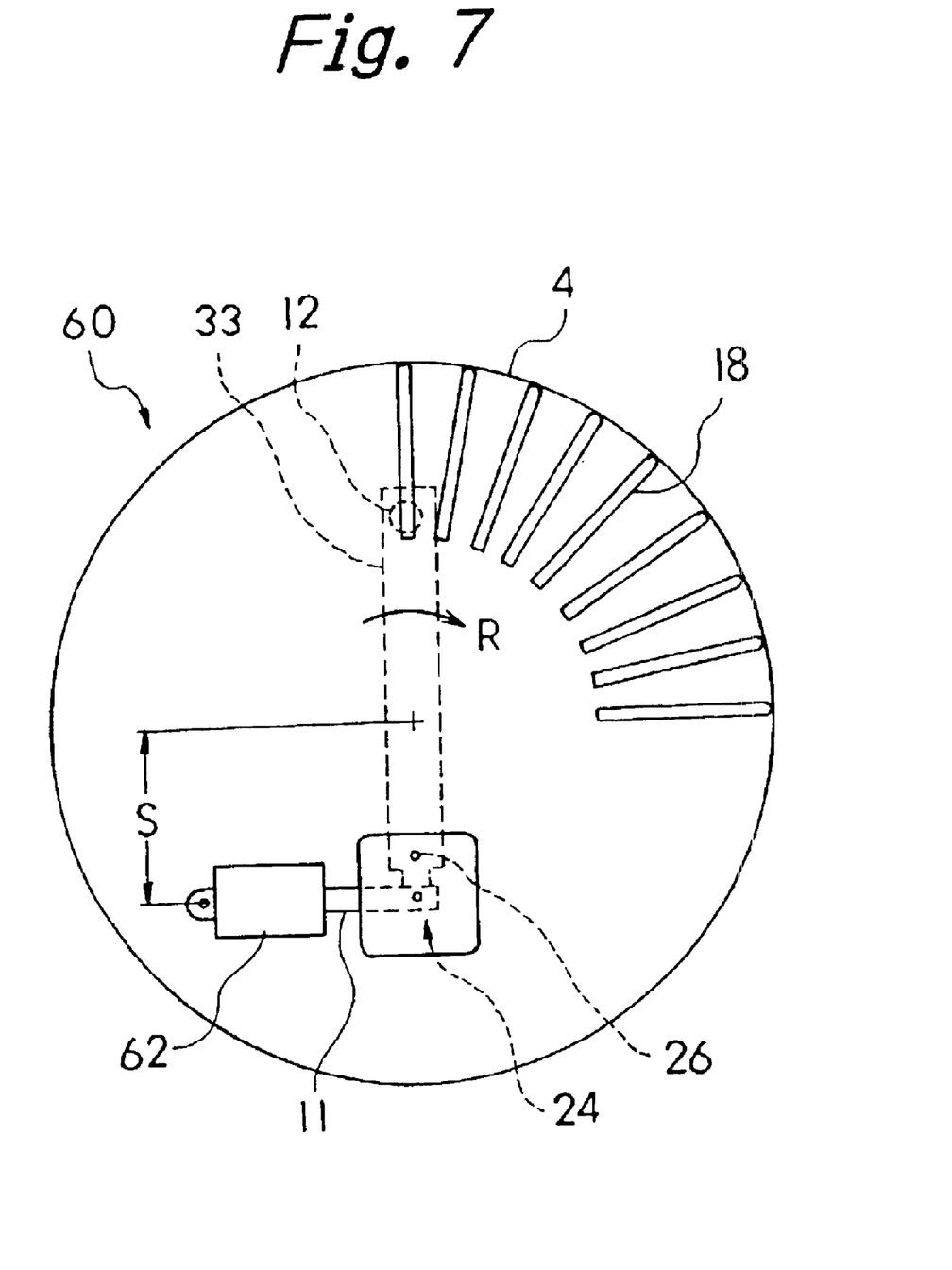
FIG. 7 is a frontal view of a further modified coupling.

FIG. 7 is a frontal view of a fluid friction coupling 60 accompanying with a thermo-pellet (thermo-wax) type temperature sensitive element 62 according to a further modified embodiment. Some portions are cut off.

In this embodiment, similar to FIG. 4, the valve lever 33 is elongated, so that the location of the connecting portion 24 between the pin 11 and the valve lever 33 is translated into a location having an offset S from the center of the cover 4. The leverage for rotating the valve lever 33 towards the circumferential clockwise direction R is increased. Thus, the sensitivity of the fluid coupling is enhanced.

Further in this embodiment, the use of the compact thermo-pellet (thermo-wax) type temperature sensitive element 62 enables the element to be located in a small area for obtaining a large stroke. Therefore, the sensitivity of the fluid coupling can be further enhanced.

Figure 8A:
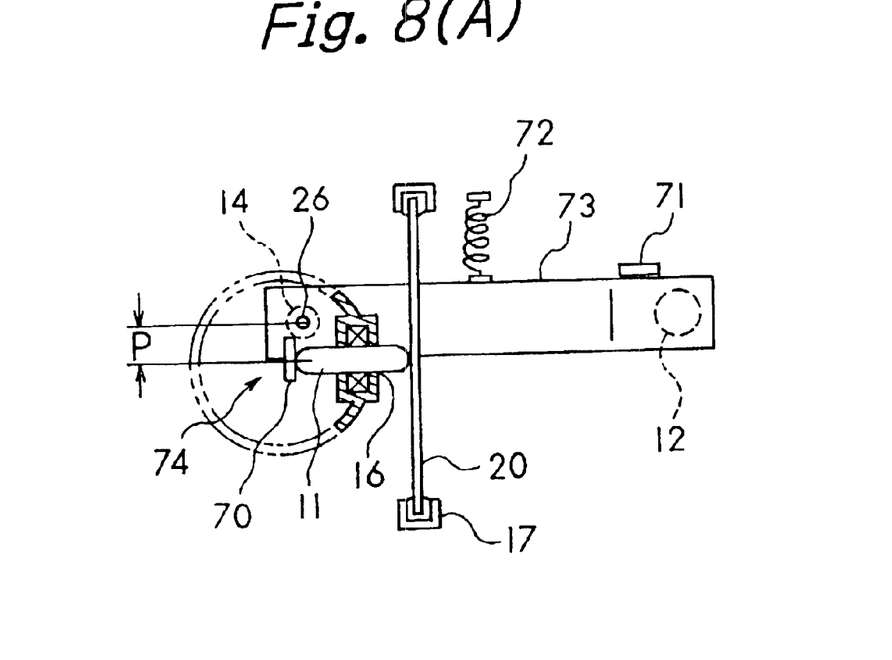
FIGS. 8a, 8b are sectional views of a further modified linkage mechanism.
Figure 8B:
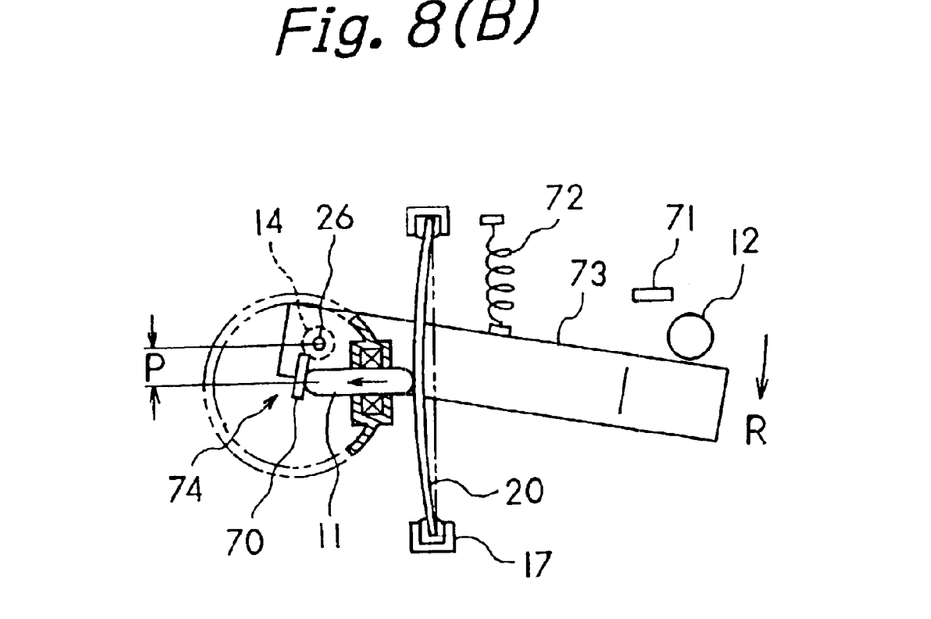

FIGS. 8a, 8b illustrate a temperature control linkage mechanism according to a further modified embodiment. FIG. 8a shows the OFF condition in which the leaf-spring type valve lever 73 closes the valve opening 12, and FIG. 8b shows the ON condition in which the valve lever 73 opens the valve opening 12.

In these figures, each end of the bimetal 20 is movably supported by the bracket 17 fixed to the cover 4. One end of the actuating pin 11 abuts against the central portion of the bimetal 20, and the other end of the pin 11 extends through the guide hole 16 of the cover 4 into the inside of the coupling 10, abutting against a vertical plate 70 fixed near the root end of the valve lever 73. Thus, an abutment portion 74 is provided between the pin 11 and the valve lever 73.

The OFF condition of FIG. 8a is held by a cooperation of a return spring 72 connected to the valve lever 73 and a stop plate (stopper) 71. The valve lever 73 abuts against the pin 11 by way of the vertical plate 70 near the root end of the valve lever 73 biased by the spring 72. The swing end of the valve lever 73 is held in contact with the surface of the valve opening 12 by reason of its inherent tension. The root end of the valve lever 73 is supported on the pivot 26 of the protrusion 14 arranged on the partition 7 such that it can move parallel to the surface of the partition 7.

If the air temperature coming from a radiator rises beyond 60 degrees centigrade, as shown in FIG. 8b, the bimetal 20 curves and the pin 11 is pushed towards left, and then the valve lever 73 rotates towards the clockwise direction R, whereby the swing end of the valve lever 73 leaves the valve opening 12 permitting the coupling into the ON condition.

This embodiment has an advantage that a space for accommodating the bimetal 20 and the valve lever 73 becomes relatively small, so that a compact design of the linkage mechanism is achieved. In addition, if the distance P between the pivot 26 and the axis of the pin 11 is made relatively small, the leverage for swinging the valve lever 73 becomes large, so that the sensitivity of the coupling is enhanced.

Figure 9A:
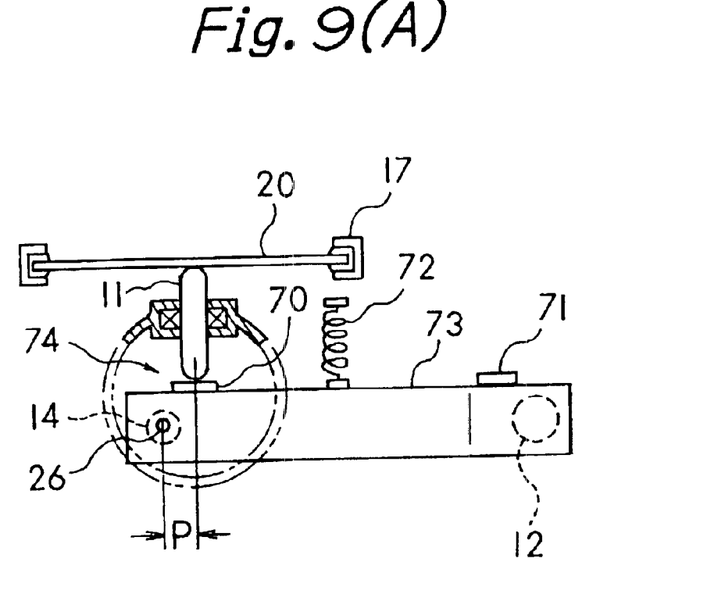
FIGS. 9a, 9b are sectional views of a further modified linkage mechanism.
Figure 9B:
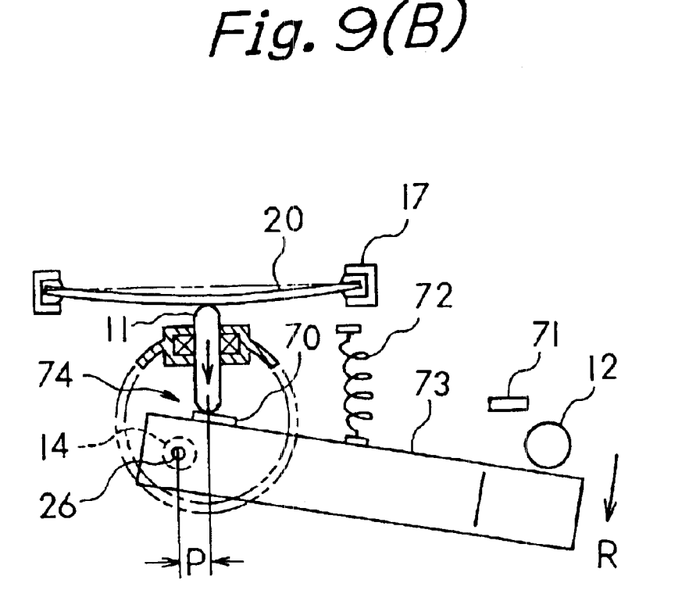

FIGS. 9a, 9b illustrate a temperature control linkage mechanism according to a further modified embodiment. FIG. 9a shows the OFF condition in which the leaf-spring type valve lever 73 closes the valve opening 12, and FIG. 9b shows the ON condition in which the valve lever 73 opens the valve opening 12.

In contrast to FIGS. 8a, 8b in which the bimetal 20 and the valve lever 73 are arranged in vertically crossing fashion, in FIGS. 9a, 9b the bimetal 20 and the valve lever 73 are arranged in parallel fashion. The function each of the vertical plate 70, the abutment portion 74, the return spring 72 and the stop plate 71 is the same as in FIGS. 8a, 8b. According to the embodiment of FIG. 9, the space for accommodating the bimetal 20 and the valve lever 73 becomes further small.

Figure 10:
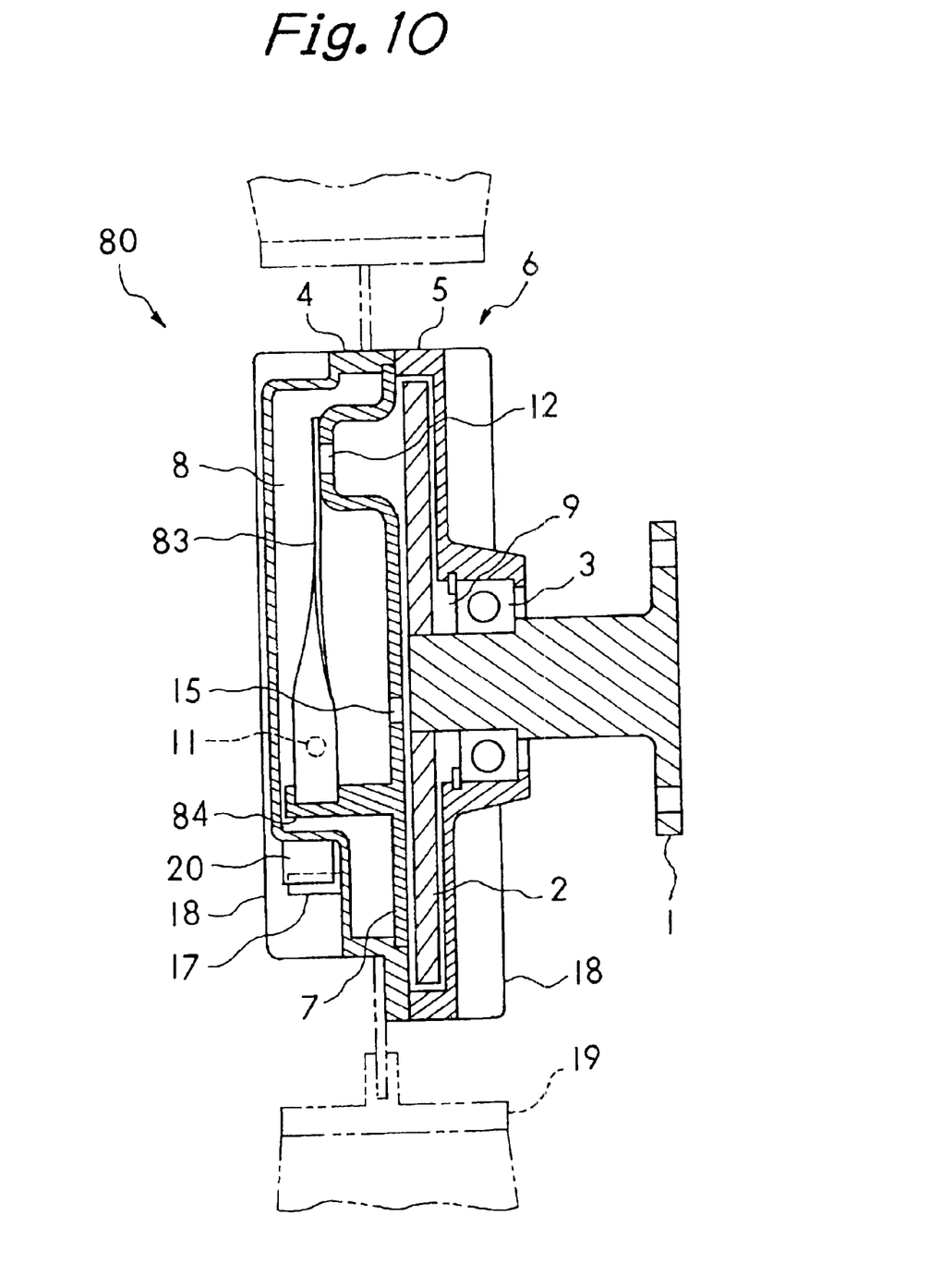
FIG. 10 is a vertical sectional view of a further modified fluid coupling.
Figure 11A:
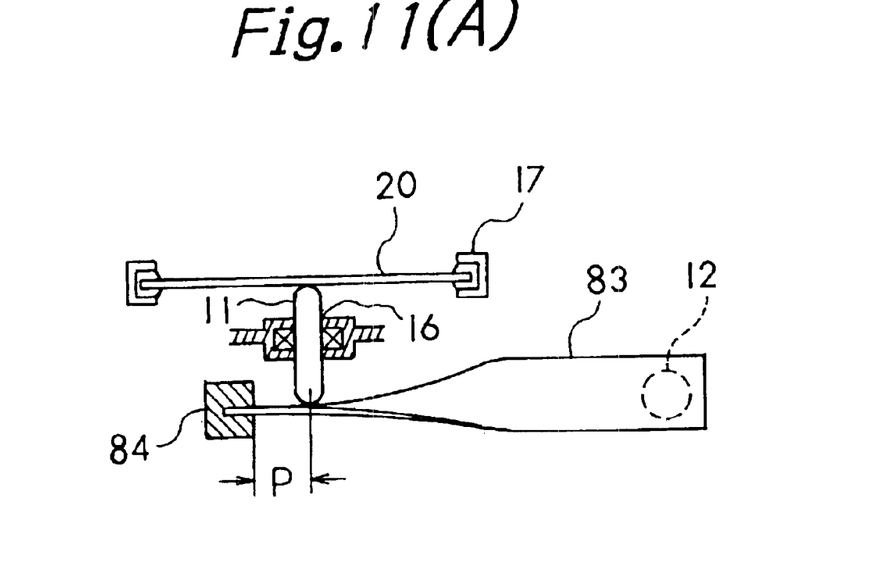
FIGS. 11a, 11b are sectional views of a further modified linkage mechanism.
Figure 11B:
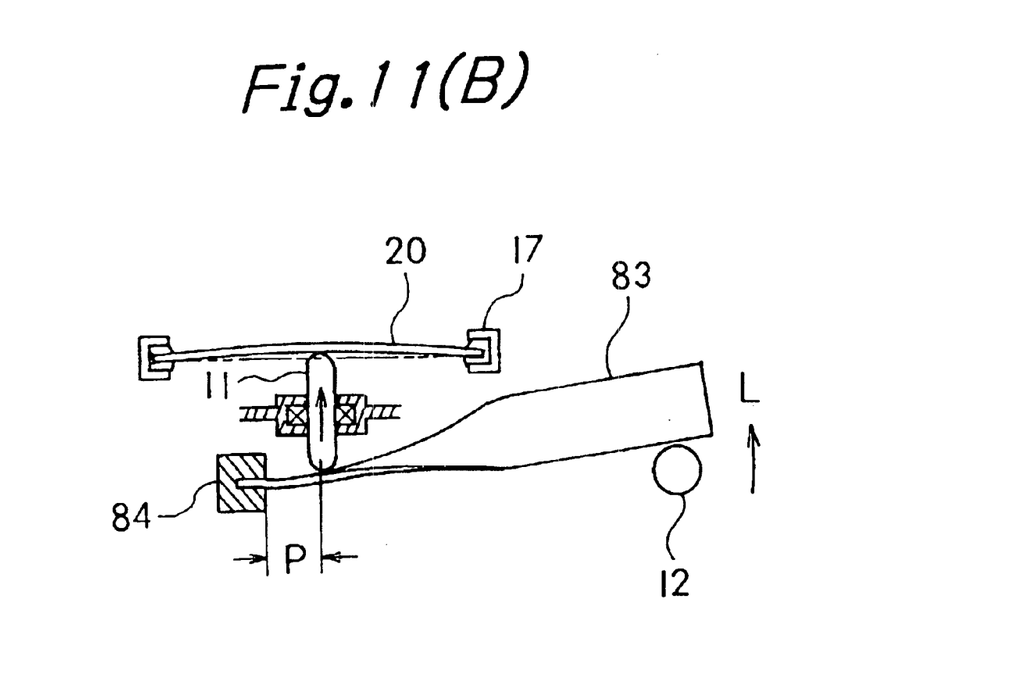

FIGS. 10 illustrates a temperature-controlled fluid friction coupling 80 in its OFF condition according to a further modified embodiment. FIGS. 11a, 11b illustrates a temperature control linking mechanism. The basic construction of this fluid coupling 80 is the same as in FIG. 1, and only temperature control linkage mechanism is different.

Also in this embodiment, based upon the deformation of the bimetal 20, the actuating pin 11 moves along the direction parallel to the surface of the partition 7, as in FIG. 1.

As a characteristic of this embodiment, the valve lever 83 is made in a form that an elongated rectangular plate is twisted in 90 degree angle in its intermediate portion. The root end of the valve lever 83 is secured to an anchor block 84 fixed to the partition 7. Near the root end of the valve lever 83, at a distance P from the anchor block 84, the pin 11 abuts against the valve lever 83. The swing end of the valve lever 83 moves along circumferential directions of the coupling 80 keeping in touch with the surface of the partition 7 having the valve opening 12 therein.

FIGS. 11a, 11b illustrate a control linkage mechanism of FIG. 10. FIG. 11a shows the OFF condition in which the twisted type valve lever 83 closes the valve opening 12, and FIG. 11b shows the ON condition in which the valve lever 83 opens the valve opening 12.

In these figures, each end of the bimetal 20 is movably supported by the bracket 17 fixed to the cover 4. One end of the actuating pin 11 abuts against the central portion of the bimetal 20, and the other end of the pin 11 extends through the guide hole 16 of the cover 4 into the inside of the coupling 80, abutting against the valve lever 83.

If the air temperature coming from the radiator rises beyond 60 degrees centigrade, as shown in FIG. 11b, the bimetal 20 curves and the pin 11 is pulled up, and then the valve lever 83 rotates towards the counterclockwise direction L by reason of its inherent tension, whereby the swing end of the valve lever 83 leaves the valve opening 12 permitting the coupling to be in the ON condition.

This embodiment has an advantage that the pin 11 directly contacts with the main body of the valve lever 83, so that the linkage mechanism is relatively simplified and a compact design of the linkage mechanism is achieved. In addition, if the distance P between the edge of the anchor block 84 and the axis of the pin 11 is made relatively small, the leverage for swinging the valve lever 83 is enlarged, so that the sensitivity of the coupling is enhanced.

It should be recognized that various modifications are possible within the scope of the invention claimed.

What is claimed is:

1. A temperature-controlled fluid friction coupling for intermittently driving a cooling fan of an internal combustion engine, the temperature-controlled fluid friction coupling comprising:

a drive input shaft having a disk rotor thereon;

a housing rotatably supported on said drive input shaft for supporting a cooling fan, said housing including a body and a cover located on a plane and having a guide hole;

a partition for dividing an interior space of said housing into a torque transmitting chamber and a reservoir chamber, said partition having a valve opening:

a valve lever for opening and closing the valve opening arranged in said partition;

a temperature sensitive element comprising a bimetallic plate disposed outside of said cover and located on a plane perpendicular to the plane on which said cover is located, and an actuating pin extending through the guide hole arranged in said cover, one end of said actuating pin being in contact with said temperature sensitive element, and the other end of said actuating pin being in contact with said valve lever, wherein said actuating pin is movable in a direction parallel to a surface of said partition, and said valve lever is in contact with said actuating pin near a root end of said valve lever, and a swing end of said valve lever is slidably movable while being in contact with the surface of said partition having the valve opening therein by an inherent tension of said valve lever, and wherein, in response to a deformation of said temperature sensitive element caused by a change of ambient temperature, said actuating pin moves in a direction parallel to the surface of said partition, so that the swing end of said valve lever moves parallel to the surface of said partition while remaining in contact with the surface so as to change an open area of said valve opening, thereby controlling a fluid flow from the reservoir chamber to the torque transmitting chamber.

2. A fluid coupling as claimed in claim 1, wherein said partition has a protrusion, the root end of said valve lever is movably connected to said actuating pin, and an intermediate portion of said valve lever is supported on said protrusion arranged on said partition.

3. A fluid coupling as claimed in claim 1, wherein said valve lever a rectangular plate having an intermediate portion that is twisted by 90 degrees, a portion of said valve lever near the root end of said valve lever is in contact with said actuating pin, said partition has an anchor block, and the root end of said valve lever is supported on said anchor block arranged on said partition.

* * * * *